(12) United States Patent
Saito et al.

(10) Patent No.: US 6,204,927 B1
(45) Date of Patent: *Mar. 20, 2001

(54) IMAGE FORMING APPARATUS AND METHOD OF CONTROLLING SAME

(75) Inventors: Keita Saito; Hayato Shinohara, both of Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/887,901

(22) Filed: Jul. 8, 1997

(30) Foreign Application Priority Data

Jul. 8, 1996 (JP) .................................................. 8-178233

(51) Int. Cl.$^7$ .................................................. B41B 11/24
(52) U.S. Cl. .......................................... 358/1.12; 355/319
(58) Field of Search ............................ 395/112; 355/319; 358/1.12

(56) References Cited

U.S. PATENT DOCUMENTS

| | | | |
|---|---|---|---|
| 5,095,342 | * 3/1992 | Farrell et al. | ......................... 355/319 |
| 5,276,875 | * 1/1994 | Satoh | ................................... 395/650 |
| 5,504,568 | * 4/1996 | Saraswat et al. | ..................... 355/308 |

* cited by examiner

*Primary Examiner*—Mark Zimmerman
*Assistant Examiner*—Lance W. Sealey
(74) *Attorney, Agent, or Firm*—Fitzpatrick, Cella, Harper & Scinto

(57) ABSTRACT

Provided is an apparatus for efficiently forming images (color or black-and-white) on both sides of recording mediums. To this end, a provided image forming apparatus for forming a plurality of images successively on recording mediums is featured in comprising:

1) intermediate transfer means capable of retaining an image corresponding to the image to be formed,
2) transfer means for transferring the image on the intermediate transfer means onto a recording medium, and
3) reversing means for reversing the recording medium so that an image is to be formed on the rear side of the recording medium having the image transferred onto the front side thereof. Further, a control process for image forming is performed by controlling a sequence of forming the plurality of images depending on an image forming condition when the plurality of images are formed successively on both sides of the recording mediums under cooperation with the reversing means.

29 Claims, 8 Drawing Sheets

IMAGE FORMING APPARATUS AND METHOD OF CONTROLLING SAME

BACKGROUND OF THE INVENTION

1. Field of the Invention

The present invention relates to an image forming apparatus and a method of controlling the image forming apparatus.

2. Description of the Related Art

Heretofore, there is known an apparatus wherein an electrostatic latent image is formed on a photosensitive drum in accordance with input image information data and developed by depositing toner on it, a developed toner image is transferred onto an intermediate transfer body, and the toner image transferred onto the intermediate transfer body is secondary-transferred onto a recording medium.

Meanwhile, Models CLC 700/800 manufactured by Canon Inc. are known as apparatus wherein images in yellow (Y), magenta (M), cyan (C) and black (Bk) are formed frame-sequentially on a sheet of recording paper without using an intermediate transfer body (i.e., without secondary transfer). In these apparatus, a full-color hard copy can be produced by superposing toner images in yellow (Y), magenta (M), cyan (C) and black (Bk) one above another. Further, in a full-color image forming apparatus such as Canon CLC 700/800, it is also possible to form a monochrome image (in black, for example) and form images on both sides of a paper sheet.

However, conventional both-side recording in such an apparatus still has a room for further improvement because the both-side recording is always performed in the same sequence or timed relation and accompanies with a problem from the standpoint of efficiency in image forming.

Further, the image forming apparatus without using an intermediate transfer body has a problem that an apparatus size is increased. If a both-side image forming function is added to that apparatus, a reversing unit for reversing a recording medium upside down would require to be added, resulting in a problem of further increasing the apparatus size.

SUMMARY OF THE INVENTION

An object of the present invention is to provide an image forming apparatus which has succeeded in solving the problems stated above.

The present invention intends to provide an image forming apparatus in which optimum both-side recording can be performed at a high speed by changing an image forming sequence, a method of controlling the image forming apparatus, and a storage medium storing the control method. Additionally, the present invention intends to provide a controller which can inform the host side (external device) of a time required for forming desired images in accordance with the image forming sequence when it is determined.

Another object of the present invention is to provide an image forming apparatus which can realize a both-side image forming function without increasing an apparatus size so much.

According to one embodiment of the present invention, there is provided an image forming apparatus for forming a plurality of images successively on recording mediums, the apparatus comprising intermediate transfer means capable of retaining an image corresponding to the image to be formed, transfer means for transferring the image on the intermediate transfer means onto a recording medium, and reversing means for reversing the recording medium so that an image is to be formed on the rear side of the recording medium having the image transferred onto the front side thereof.

Still another object of the present invention is to provide an image forming apparatus having a novel function, and a method of controlling the image forming apparatus.

The features of the present invention will be apparent from the following description of an embodiment and the accompanying drawings.

DETAILED DESCRIPTION OF THE PREFERRED EMBODIMENT

One preferred embodiment of the present invention will be described hereunder in detail with reference to the accompanying drawings.

Construction of Control System in Image Forming Apparatus

Figure 1:
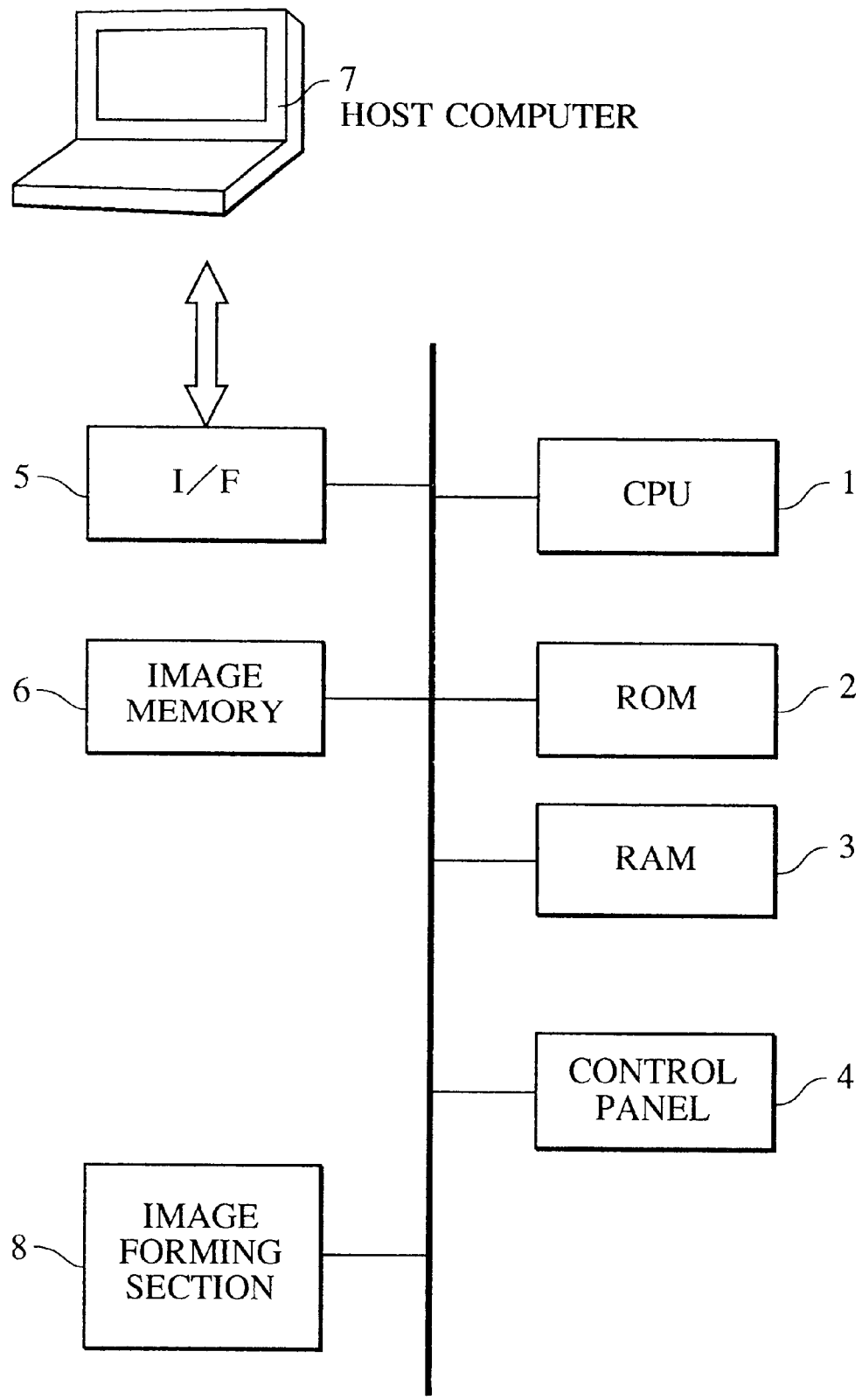
FIG. 1 is a block diagram of a control system in an image forming apparatus according to one embodiment of the present invention.

FIG. 1 is a block diagram of a control system in an image forming apparatus (laser beam printer) according to the embodiment.

In FIG. 1, denoted by reference numeral 1 is a CPU supervising control of the entire apparatus, and 2 is a ROM storing operation processing procedures (programs) for the CPU 1. Denoted by 3 is an RAM used as a work area for the CPU and 4 is a control panel. Denoted by 5 is an interface for receiving data from a host computer 7 via a network (LAN) or the like, and 6 is an image memory for developing bit mapped data to be printed. The image memory 6 has a capacity capable of developing full-color image data up to the A3 size with a desired resolution in a printer engine for actually forming images. Therefore, the image memory 6 can store full-color image data for 2 pages of A4 size and monochrome image data for 8 pages of A4 size. The bit mapped data developed in the image memory 6 is PWM-modulated, for example, and transmitted to an image forming section 8 in which images are formed as described later.

Description of Entire Image Forming Apparatus

Figure 2:
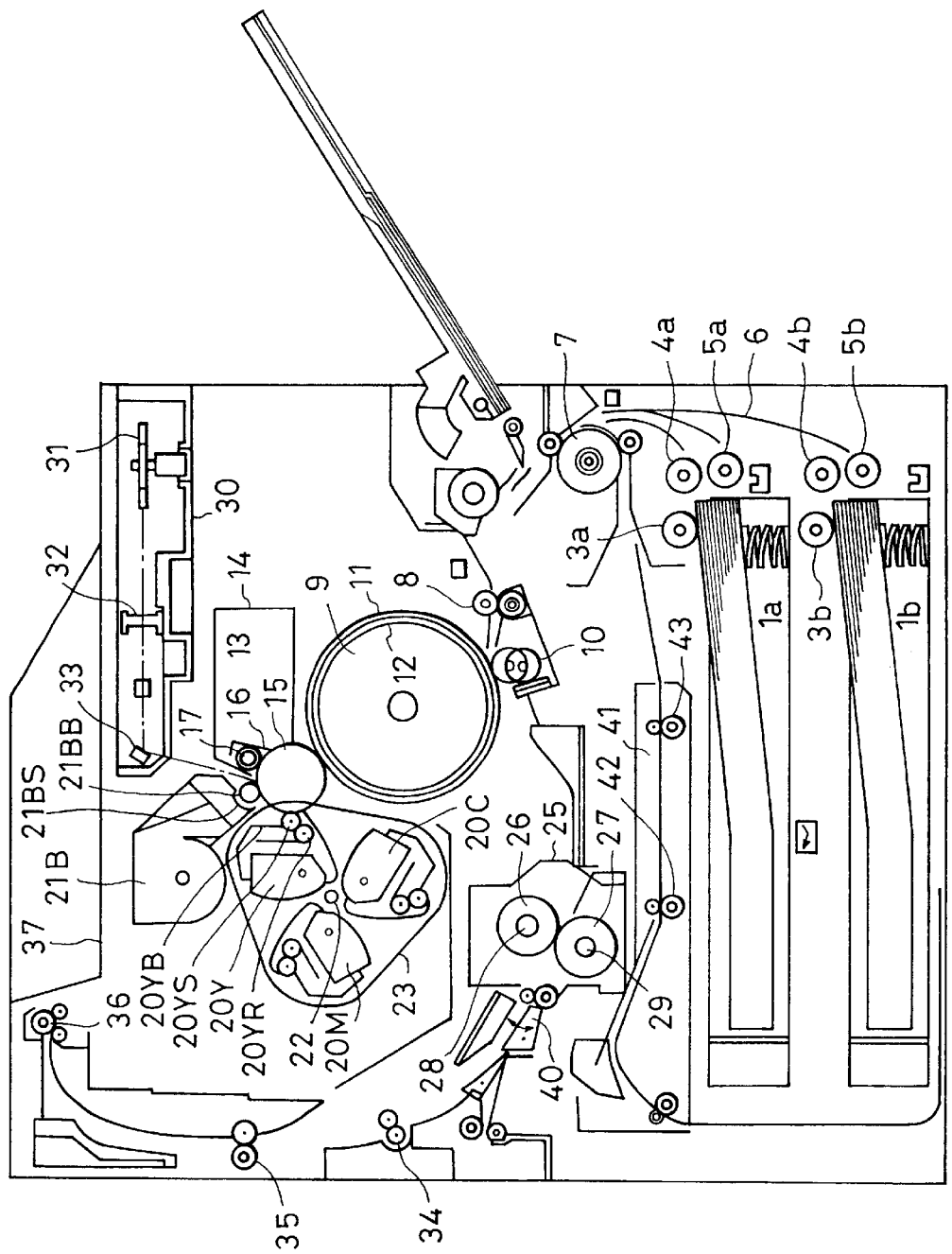
FIG. 2 is a sectional view showing a structure of the image forming apparatus according to the embodiment.

FIG. 2 shows a sectional structure of the image forming apparatus according to the embodiment.

As shown in FIG. 2, an image forming section forms a color image below. Latent images are developed by a developing section 23 including a fixed black developer 21B and three rotatable color developers. Developed images are multi-transferred onto an intermediate transfer body 9 to produce a color image. The color image on the intermediate transfer body 9 is further transferred onto a transfer sheet transported from a paper feed section. The transfer sheet having the color image thereon is sent to a fusing section 25 where the color image is fused onto the transfer sheet. After that, the transfer sheet is ejected by an ejection roller to an ejecting section 37 at the top of the apparatus.

Note that the three rotatable color developers and the fixed black developer 21B are mounted to a printer body in an individually detachable manner.

Image light is exposed to the image forming section from a scanner section 30. Specifically, when an image signal is applied to a laser diode, the laser diode irradiates image light corresponding to the image signal to a polygon mirror 31. The polygon mirror 31 is rotated by a scanner motor at a high speed, and the image light reflected by the polygon mirror 31 is selectively exposed to the surface of an image carrier 15 rotating at a constant speed through a focusing lens 32 and a reflecting mirror 33.

Various components of the above image forming section will now be described in detail one by one.

Image Carrier Unit

A drum unit 13 has a unitary structure comprising an image carrier (photosensitive drum) 15 and a cleaner container 14 which serves also as a holder for the image carrier 15. The drum unit 13 is supported by the printer body in a detachable manner so that it may be easily replaced altogether in conformity with the life of the image carrier 15. The image carrier 15 in this embodiment is constructed by coating an organic photoconductive layer over an outer circumferential surface of an aluminum cylinder with a diameter of about 60 mm, and is rotatably supported by the cleaner container 14 which serves also as a holder for the image carrier 15. A cleaner blade 16 and a primary charging means 17 are arranged around the image carrier 15. Driving force of a drive motor (not shown) is transmitted to one end of a shaft of the image carrier 15 extending rearward of the drawing sheet, whereby the image carrier 15 is rotated counterclockwise, as viewed on the drawing, in accordance with the image forming operation.

Charging Means

The charging means 17 operates based on a contact charging method. Specifically, the charging means 17 has an electrically conductive roller which is brought into contact with the image carrier 15, and a voltage is applied to the electrically conductive roller so that the surface of the image carrier 15 is uniformly charged.

Cleaning Means

Cleaning means is to clean the toner remaining on the image carrier 15 after the visualized toner produced on the image carrier 15 by developing means has been transferred onto the intermediate transfer body 9. The waste toner removed by the cleaning means is accumulated in the cleaner container 14. The amount of the waste toner accumulated in the cleaner container 14 is selected so that the waste toner will not fill up the cleaner container 14 earlier than the span of life of the image carrier 15. Accordingly, the cleaner container 14 is replaced together with the image carrier 15 at the same time as when the image carrier 15 is replaced at the end of its life.

Developing Means

For visualizing latent images formed by the charging means, developing means comprises three rotatable color developers 20Y, 20M, 20C capable of developing latent images in respective colors of yellow, magenta and cyan, and one black developer 21B.

The black developer 21B is a fixed developer as explained above, and has a sleeve 21BS disposed in opposed relation to the image carrier 15 with a minute gap left between the sleeve and the image carrier 15. The black developer 21B forms a visible image with black toner on the image carrier 15.

In the black developer 21B, the black toner in a container is supplied to the sleeve 21BS by a feeding mechanism and is coated in the form of a thin layer over an outer circumferential surface of the sleeve 21BS rotating clockwise, as viewed on the drawing, by a coating blade 21BB held in pressure contact with the outer circumferential surface of the sleeve 21BS, while electric charges are applied to the toner (frictional charging). In addition, a development bias is applied to the sleeve 21BS, causing a latent image on the image carrier 15 to be developed with the toner.

The three rotatable color developers 20Y, 20M, 20C are detachably held by a development rotary 23 rotating about a shaft 22. In an image forming process, the developers are rotated about the shaft 22 while being held by the development rotary 23. Then, predetermined one of the developers is stopped in a position opposite to the image carrier 15 and its developing sleeve is positioned to face the image carrier 15 with a minute gap (about 300 $\mu$m) therebetween. After that, a visible image is formed on the image carrier 15. When a color image is to be formed, the development rotary 23 is intermittently rotated with predetermined angular intervals for each rotation of the intermediate transfer body 9, and a developing process is performed by using the yellow developer 20Y, the magenta developer 20M, the cyan developer 20C and the black developer 21B in the order named. In other words, while the intermediate transfer body 9 is rotating four times, visible images are successively formed with toner in respective colors of yellow, magenta, cyan and black. As a result, a full-color visible image is formed on the intermediate transfer body 9.

FIG. 2 shows a state where the yellow developer 20Y is positioned and kept at a standstill in a location facing the image transfer unit. In the yellow developer 20Y, the toner in a container is supplied to a coating roller 20YR by a feeding mechanism and is coated in the form of a thin layer over an outer circumferential surface of a sleeve 20YS rotating clockwise, as viewed on the drawing, by the coating roller 20YR rotating clockwise and a blade 20YB held in pressure contact with the outer circumferential surface of the sleeve 20YS, while electric charges are applied to the toner (frictional charging). In addition, a development bias is applied to the sleeve 20YS facing the image carrier 15 on which a latent image is formed, causing the latent image on the image carrier 15 to be developed with the toner. Also, the magenta developer 20M and the cyan developer 20C perform toner development through the same mechanism as described above.

Additionally, when the rotatable color developers 20Y, 20M, 20C are each rotated to the developing position, their sleeves are each connected to a driving source and a high-voltage power supply for development in respective colors which are mounted in the printer body. Thus, when a latent image is developed in each color, the rotatable color developers 20Y, 20M, 20C are selectively applied with a voltage and connected to the driving source in sequence.

Intermediate Transfer Body

The intermediate transfer body 9 rotates clockwise, as viewed on the drawing, to receive multi-transfer of toner images four times from the image carrier in the process of color image forming. The intermediate transfer body 9 having received multi-transfer of toner images four times then transfers the toner images in respective colors thereon onto a transfer sheet at the same time in cooperation with a transfer roller 10 which is applied with a voltage and feeds the transfer sheet while nipping it between itself and the intermediate transfer body 9.

The intermediate transfer body 9 in this embodiment is constructed by coating an elastic layer 11 formed of a medium-resistance sponge, medium-resistance rubber or the like over an outer circumferential surface of an aluminum cylinder 12 with a diameter of 180 mm. The intermediate transfer body 9 is rotatably supported and rotated through a gear (not shown) which is integrally fixed to the body 9 and supplied with driving force.

Note that because the intermediate transfer body 9 has a diameter of 180 mm as mentioned above, at least two toner images of A4 width size (each corresponding to a sheet of A4 size lying with its long side going ahead) can be formed on the intermediate transfer body 9.

Paper Feed Section

A paper feed section is to feed a transfer sheet to the image forming section. A multiplicity of transfer sheets are accommodated in a cassette 1a or 1b. Paper feed rollers 3a, 3b are held in contact with top one of the transfer sheets in the respective cassettes to take out the transfer sheets one by one. The transfer sheet taken out by the paper feed roller 3a (or 3b) is transported along a paper feed guide 6 while it is held between a pair of feed rollers 4a, 5a (or 4b, 5b) and then to a regist roller 8 by a common transport roller 7. In the process of image forming, the regist roller 8 performs non-rotating operation to keep the transfer sheet in a rest standby state and rotating operation to transport the transfer sheet toward the intermediate transfer body 9 in a predetermined sequence, thereby positioning the transfer sheet with respect to the toner images for a transfer step as next one.

Also, the transport roller 7 takes in a transfer sheet having been reversed upside down by a reversing unit 41 and supplies it to the regist roller 8 again.

Transfer Section

A transfer section comprises a swingable transfer roller 10. The transfer roller 10 is constructed by winding a medium-resistance foamed elastic material over a metallic cylinder. The transfer roller 10 is movable in the vertical direction, as viewed on the drawing, and is connected to a driving source. During the period in which toner images in four colors are formed on the intermediate transfer body 9, i.e., while the intermediate transfer body 9 are rotating four times, the transfer roller 10 is displaced to a lower position away from the intermediate transfer body 9, as indicated by a fat line, in order not to disturb the toner images. At the proper timing to transfer a full-color image onto the transfer sheet after the toner images in four colors have been formed on the intermediate transfer body 9, the transfer roller 10 is swung by a cam member (not shown) to an upper position, indicated by a thin line, where the transfer roller 10 is pressed against the intermediate transfer body 9 under a predetermined pressure through the transfer sheet. At the same time, a bias is applied to the transfer roller 10, causing the toner images on the intermediate transfer body 9 to be transferred onto the transfer sheet. Because the intermediate transfer body 9 and the transfer roller 10 are driven to rotate in opposing directions, the transfer sheet held between both the members is transported at a predetermined speed leftward on the drawing to a next step, i.e., a fusing section, as the transfer step proceeds.

Fusing Section

A fusing section 25 is to fuse the toner images which have been formed by the above developing means 20, 21 and then transferred onto the transfer sheet through the intermediate transfer body 9. As shown in FIG. 1, the fusing section 25 comprises a fusing roller 26 for applying heat to the transfer sheet, and a pressing roller 27 for bringing the transfer sheet into contact pressure with the fusing roller 26. The rollers 26, 27 are both hollow rollers provided with heaters 28, 29 built therein and are driven to rotate for transporting the transfer sheet in parallel with heating it under pressure.

In other words, the transfer sheet holding the toner images thereon is transported by cooperation of the fusing roller 26 and the pressing roller 27, while the toner is firmly fused onto the transfer sheet under the heat and pressure applied from both the rollers.

Reversing Unit

A reversing unit is a mechanism for reversing a transfer sheet on one side of which an image has been fused, so that an image is to be formed on the other side of the transfer sheet.

If necessary processes have all been completed for the transfer sheet having an image fused as explained above, the transfer sheet is ejected onto a paper ejection tray 37 upon driving of transport rollers 34, 35 and an ejection roller 36. On the contrary, for the transfer sheet for which the necessary processes have not yet been completed, the transport rollers 34, 35 are rotated backward after the transfer sheet having a fused image has been transported to a certain extent by the transport rollers 34, 35 in the ejecting direction. At this time, a flapper 40 is shifted upward (turned clockwise) as shown in FIG. 2, causing the transfer sheet to enter a reversing transport path 41. After that, the transfer sheet is transported by reversing path transport rollers 42, 43 to the transport roller 7 from which it is transported back to the position of the regist roller 8 again.

Image Forming Sequence

A sequence of forming an image by the apparatus having the above construction will be described below.

For simplicity of description, it is assumed that a time required for a transfer sheet to be reversed upside down and transported back to the position of the regist roller through the reversing process in this embodiment is longer than a time required for the secondary transfer, but shorter than twice the latter time.

Monochrome Both-Side Recording

The case of monochrome both-side recording (black in this embodiment) on sheets of A4 size lying with its short side going ahead, i.e., the case of producing a toner image of A4 size to extend in the circumferential direction of the intermediate transfer body 9 (vertical to the rotary shaft of the intermediate transfer body 9) and recording images on both front and rear surfaces of each sheet will be first described. In this case, since toner images for two pages cannot be transferred onto the intermediate transfer body 9 (i.e., the circumferential length of the intermediate transfer body 9 is not enough to transfer toner images for two pages of A4 length size thereon at the same time), a toner image for one page is primary-transferred onto the intermediate transfer body 9, and thereafter secondary-transferred onto recording paper as a transfer sheet.

The description will be made below in accordance with an operation sequence shown in FIG. 3.

In a first step, an electrostatic latent image to be recorded in black on a second page (i.e., an image on the rear side of a first sheet) is formed on the image carrier 15. This latent image is developed by the black developer 21B and primary-transferred onto the intermediate transfer body 9. At this time, a transfer sheet (of A4 size lying with its short side going ahead) is transported from the cassette to the regist roller 8 and kept in a standby state. The black toner image formed on the intermediate transfer body 9 is secondary-transferred onto the transfer sheet and then fused in the fusing section 25. The transfer sheet having the fused image thereon is transported back to the regist roller 8 again through the operation of the reversing unit explained above.

To make not useless the period of time during which the transfer sheet is reversed upside down through the reversing operation, a next transfer sheet is subject to steps of development, transfer and fusing (a series of these steps will be referred to as an image forming process hereinafter) for a fourth page (i.e., an image on the rear side of a second sheet).

Accordingly, when the image of the second page is recorded on the first transfer sheet, the image forming process is skipped one sequence and the image of the fourth page is formed on the second transfer sheet in the second image forming process.

When the image forming process for the fourth page on the second transfer sheet is completed in such a way, the image forming process for a first page (i.e., an image on the front side of the first sheet) is performed on the first transfer sheet having been reversed upside down through the reversing operation. Then, the first transfer sheet is now transported to and ejected on the paper ejection tray 37.

After, the image forming process is executed without a brake in accordance with the above sequence. But when images are recorded on both sides of the last transfer sheet, there is no succeeding transfer sheet on which an image is to be recorded, and hence the image forming process is skipped one sequence.

By carrying out the both-side recording in such a manner, the transfer sheets are stacked in the paper ejection tray 37 one above another in the due order of page numbers. Note that FIG. 3 also shows a general sequence of the monochrome both-side recording.

Both-Side Recording No. 1 of Full-Color Image

In the monochrome both-side recording, as described above, since it takes a time to reverse a transfer sheet upside down by the reversing unit and transport it back to the transport roller 8, image data of at least four pages is required to be stored. This is because the sequence of FIG. 3 requires, for example, that the image of the third page be recorded after the image of the sixth page has been recorded. If the sequence of FIG. 3 is applied to formation of a full-color image, an image memory would be required to have a large scale of capacity. (The reason is that a full-color image of one page is formed by three (or four) images in Y, M, C (and Bk) and requires data three (or four) times as many as a monochrome image of one page.)

In this embodiment, therefore, the image forming sequence is controlled depending on the number of colors used in an image to be recorded, the size of the transfer sheet, and the direction in which the image is to be recorded on the transfer sheet.

First, comparing to the above monochrome both-side recording on sheets of A4 size lying with its short side going ahead, a sequence for a full-color image recording on sheets of A4 size lying with its long side going ahead will be described with reference to FIG. 4.

In the full-color image forming process, as described before, toner images in four colors are successively primary-transferred onto the intermediate transfer body 9 while it is rotating four times. After the toner images in four colors have all been primary-transferred, a full-color image is secondary-transferred onto a transfer sheet (recording paper).

Accordingly, the intermediate transfer body 9 is rotated at least three times more than as compared with the monochrome image forming process. Because one rotation of the intermediate transfer body 9 requires the same period of time as required for the secondary transfer in any of the monochrome image forming process and the full-color image forming process, the period of time corresponding to three rotations of the intermediate transfer body 9 can be allowed for the paper transporting process including the paper feed process, the reversing process, etc. This embodiment utilizes effectively such an allowance in time.

Stated otherwise, while the full-color image forming process is executed to transfer a full-color image onto the rear side (e.g., a second page) of a first transfer sheet and the first transfer sheet is reversed upside down through the reversing process, an electrostatic latent image is formed on the front side (e.g., a first page) of the first transfer sheet and its toner images in four colors are successively primary-transferred onto the intermediate transfer body 9. This results in that until the primary transfer of the toner images in four colors are completed, there is a time sufficient for the transfer sheet, on which the full-color image has been recorded on the rear side and which has been reversed upside down, to be transported to the regist roller 8.

Figure 4:
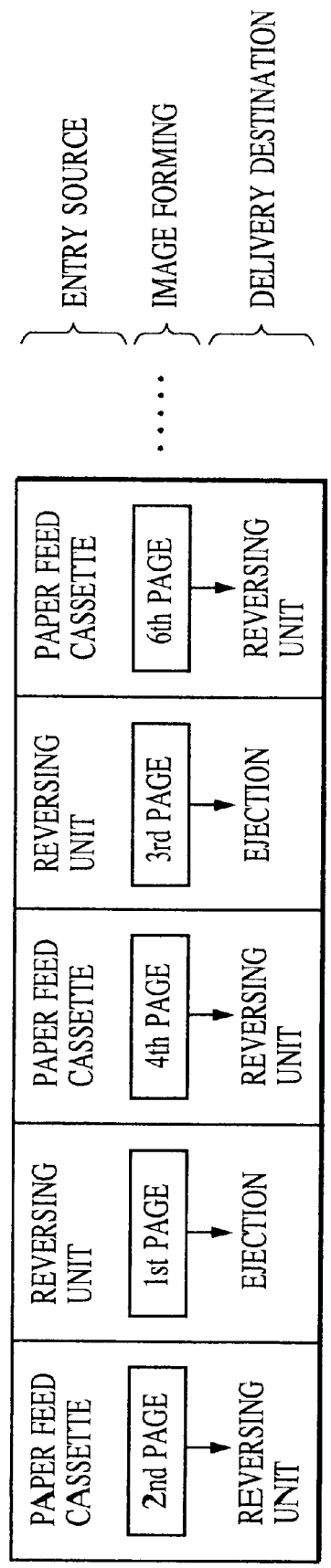
FIG. 4 is a diagram showing an image forming sequence for full-color images in units of one sheet.

Thus, the image forming sequence in this case is provided as shown in FIG. 4.

More specifically, at first, an electrostatic latent image in yellow (Y) for the second page is produced and developed into a Y toner image which is then primary-transferred onto the intermediate transfer body 9. After that, M, C and Bk toner images are successively primary-transferred onto the intermediate transfer body 9 in a like manner. A full-color toner image formed on the intermediate transfer body 9 is secondary-transferred onto one side of a transfer sheet (recording paper), fused and transported to the reversing unit. During the above process, toner images in four colors for the first page are successively primary-transferred onto the intermediate transfer body 9. At this time, before the last Bk toner image is primary-transferred onto the intermediate transfer body 9, the transfer sheet, on which the second page has been recorded and which has been reversed upside down through the reversing process, is transported back to the transfer roller 10 to be ready for transfer. A full-color toner image for the first page is then secondary-transferred onto the other side of the transfer sheet. Since the image forming process has been thereby made on both sides of the transfer sheet, the transfer sheet is now ejected to the outside through the fusing section. Subsequently (i.e., subsequent to a third page), the above process is repeated.

Both-Side Recording No. 2 of Full-Color Image

While the above description is made on the sequence for a full-color image recording on sheets of A4 size lying with its short side going ahead, a description will be made below on a sequence for a full-color image recording on sheets of A4 size lying with its long side going ahead, sheets smaller than the short side of A4 size (e.g., sheets of post card size), etc.

Because of the intermediate transfer body 9 having a diameter of 180 mm as mentioned above, if a transfer sheet of A4 or smaller size is placed such that its short side extends along the outer circumferential surface of the intermediate transfer body 9, toner images for two pages or sheets can be primary-transferred onto the surface of the intermediate transfer body 9 at a time.

Figure 5:
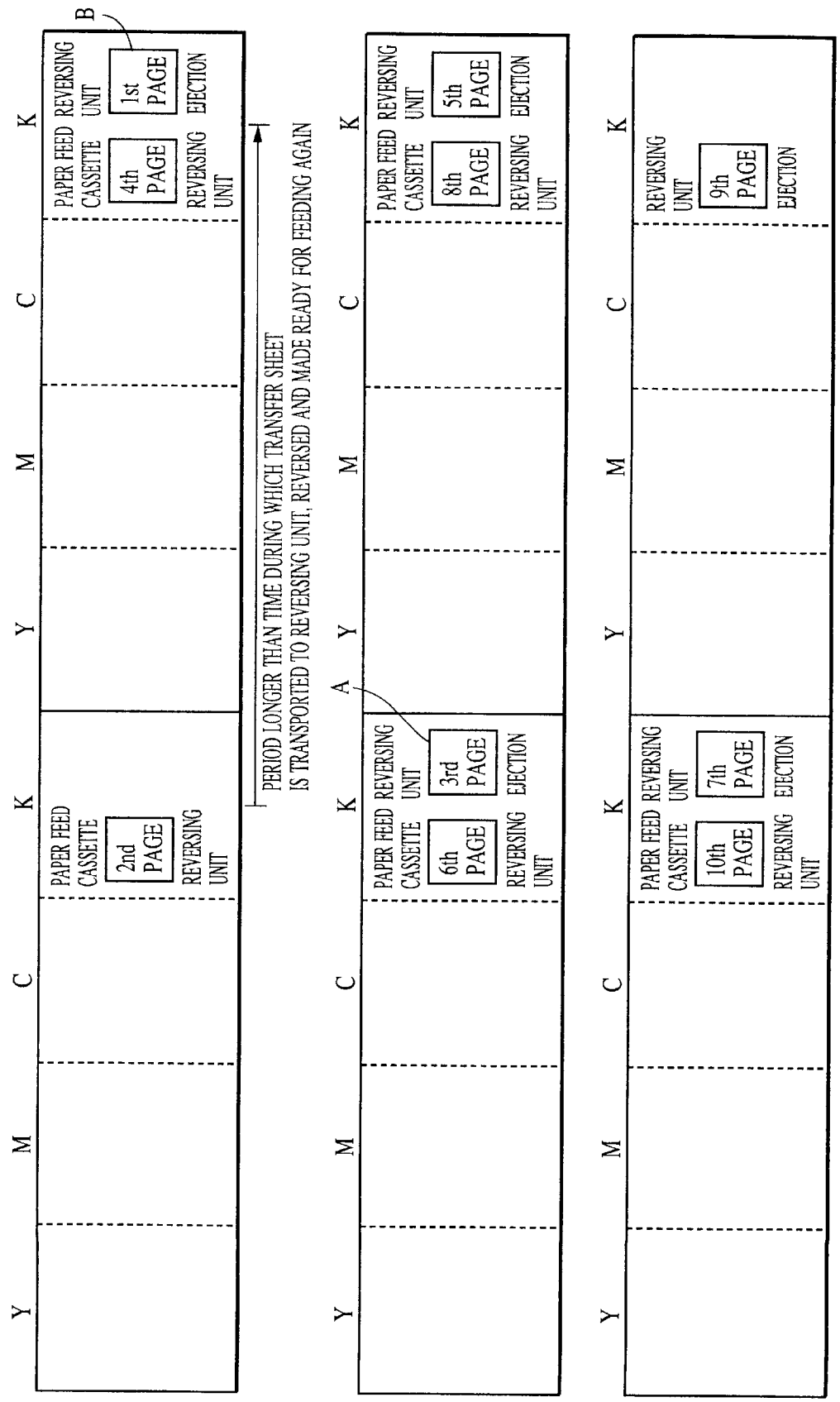
FIG. 5 is a diagram showing an image forming sequence for full-color images in units of two sheet.

Therefore, the image forming sequence in this case is provided as shown in FIG. 5.

More specifically, at first, while the image carrier 15 is making a first round, an electrostatic latent image of Y component for the second page is formed on the image carrier 15 and developed into a Y toner image which is then primary-transferred onto the intermediate transfer body 9. After that, M, C and Bk toner images are successively primary-transferred onto the intermediate transfer body 9 likewise in units of one page. The reason why an image of one page is formed during the first round is that the reversing unit cannot reverse two sheets at a time. Full-color toner image for the one page is formed in this way.

The transfer sheet having been subject to the secondary transfer is transported to the reversing unit following the predetermined sequence, and then back to the position forward of the feed roller 7. Simultaneously, one transfer sheet is delivered from the cassette and transported to the position of the regist roller 8. During the above transporting process, Y toner images for the fourth and first pages are primary-transferred onto the intermediate transfer body 9, and thereafter M, C and Bk toner images are successively primary-transferred onto the intermediate transfer body 9 likewise in units of two pages. After that, the image for the fourth page is first secondary-transferred onto the transfer sheet transported from the cassette. The transfer sheet is transported to the reversing unit and then back to the position forward of the feed roller 7. On the front side of the thus-reversed transfer sheet, an image for the third page is secondary-transferred at the timing indicated by A in FIG. 5. Though depending on a transport speed in the reversing unit, at least until the full-color toner image for the first page (indicated by B in FIG. 5) is primary-transferred onto the intermediate transfer body 9 and is started to be secondary-transferred, the first transfer sheet having been reversed upside down through the reversing unit is in a standby state at the position of the regist roller 8. The full-color toner image for the first page is then secondary-transferred onto the other side of the first transfer sheet. After that, the first transfer sheet is ejected through the fusing section. Subsequently, images are successively produced likewise in units of two pages such as 6th and 3rd pages, 8th and 5th pages, etc. Of the two images for paired pages, the image first formed is secondary-transferred onto the transfer sheet transported from the cassette and the transfer sheet having the transferred image on one side is transported to the reversing unit. The image later formed is secondary-transferred onto the transfer sheet transported from the reversing unit and the transfer sheet having the transferred images on both sides is ejected out of the apparatus. When the front side of the last page (e.g., the ninth page in the case of recording images for five sheets and ten pages) is printed, only one image is formed rather than two images and primary-transferred onto the intermediate transfer body 9. Then, the image on the intermediate transfer body 9 is secondary-transferred onto the transfer sheet transported from the reversing unit, and the transfer sheet having the transferred images on both sides is ejected out of the apparatus. Through the above-described sequence, images are formed in the same order as in the monochrome recording.

Information indicating the sequence of operation in the image forming apparatus, such as "under forming of monochrome image", "under forming of full-color image", and "in both-side forming mode", (or codes implying the same contents) is returned to the host computer 7 through the I/F 5 under control of the CPU 1, and the host computer 7 displays the received information.

Figure 8:
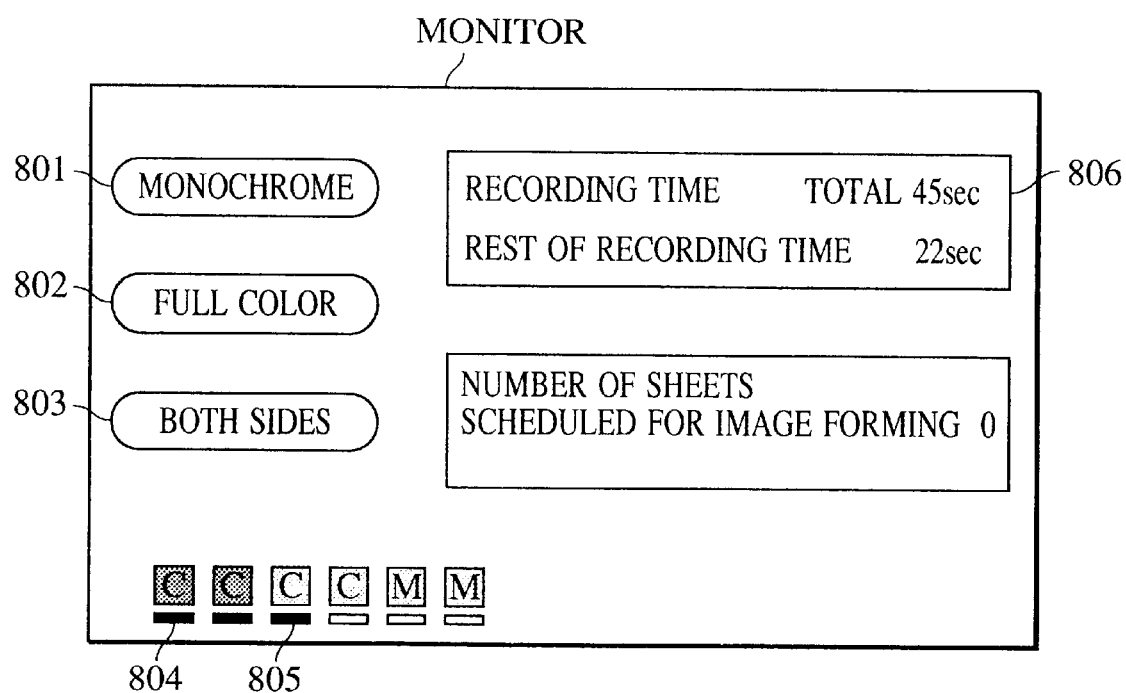
FIG. 8 shows one example of monitor display of a host computer 7.

As shown in FIG. 8, an indication 801 (MONOCHROME) on a monitor is displayed during monochrome printing, an indication 802 (FULL-COLOR) is displayed during full-color printing, and an indication 803 (BOTH SIDES) is displayed during both-side printing. Boxes 804 indicate that recording mediums (sheets) in total six are under printing (or preparation). Also, patterns "▌", and "▐" in the boxes 804 indicate that the corresponding recording mediums are to be printed on both sides and one side, respectively.

Further, the image forming apparatus has a function of informing the progress of image forming and returns the information about the progress to the host computer 7. The host computer 7 displays the received information with indicators 805, enabling the operator to recognize the progress of image forming. In FIG. 8, by way of example, the indicators 805 represent that the recording process is now completed for three of total six sheets.

Information such as color (monochrome or full color) of each image, the number of images (pages), and the sequence and combination of images to be formed (e.g., full-color images for first to fourth sheets and monochrome black images for fifth to tenth sheets) is transmitted along with image forming data from the host computer 7 to the image forming apparatus. From the transmitted information, the CPU 1 in the image forming apparatus decides what kind of image forming sequence is enabled (e.g., the image forming sequence as described above in <Both-Side Recording No. 2 of Full-Color Image> is enabled for the first to fourth sheets which are full-color images, and the image forming sequence as shown in FIG. 3 is enabled for the fifth to tenth sheets which are monochrome black images), and roughly determines a period of time in which the image forming is completed. The determined result is returned to the host computer 7. Then, the host computer 7 displays the determined result on the monitor (see 806 in FIG. 8). Therefore, the operator can recognize a total time required for the image forming and the rest of recording time until the end of the image forming. This makes the operator free from such an inconvenience that the operator comes back to the image forming apparatus prior to the end of the image forming to be carried out therein, and waits for the end of the image forming.

Furthermore, when the image forming apparatus is currently in use, information about the number of sheets scheduled for image forming and the sum of the calculated time for the process having been completed and the determined result obtained by the CPU 1 is transmitted to the host computer 7, taking into account a time until the end of the image forming currently under progress (and if there are images scheduled to be formed, a time required for forming those images). As a result, it is possible to inform the operator of recording time in consideration of periods of time required for forming the images under progress and the scheduled images as well.

Procedures of Control Processing

Figure 6:
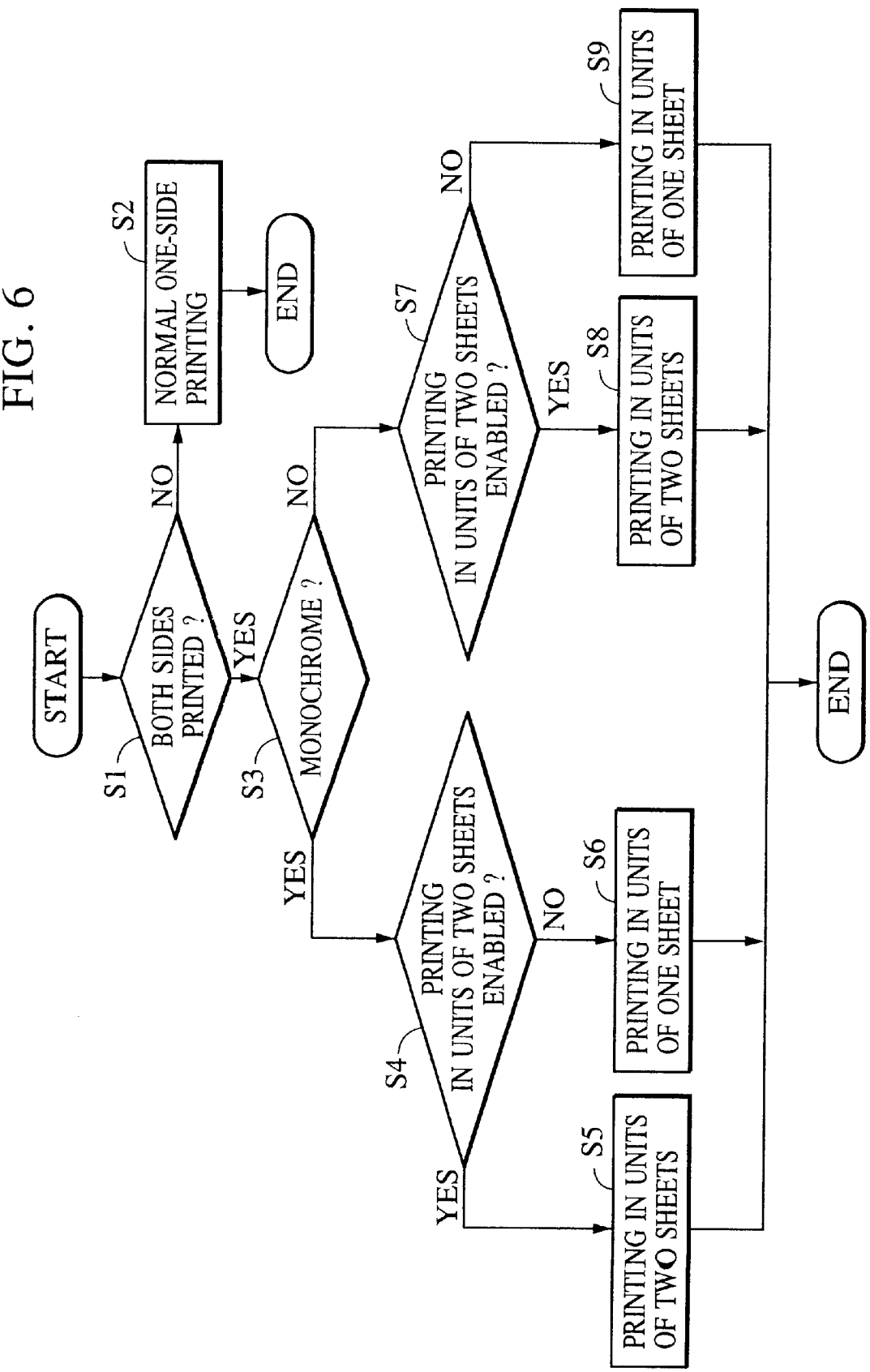
FIG. 6 is a flowchart showing an image processing procedure according to the embodiment.

To realize the process described above, the CPU 1 shown in FIG. 1 is required to control the process. Control processing procedures executed by the CPU 1 (programs stored in the ROM 2) will be described below with reference to a flowchart of FIG. 6. Note that a process of developing a bit mapped image for printing in the image memory 6 is executed in a separate task. First, it is determined in step S1 whether both-side printing is to be executed or not. This determination may be made in accordance with, for example, a printing instruction command from the host computer 7 or an instruction from the control panel 4.

If it is determined that both-side recording is not to be performed, i.e., that one-side printing is to be performed, then the control process goes to step S2 where normal one-side printing is executed.

If it is determined that both-side printing is to be executed, then the control process goes to step S3 where it is determined whether monochrome printing is to be executed or not.

If it is determined that monochrome printing is to be executed, then the control process goes to step S4 where it is determined whether printing in units of two sheets is enabled or not, i.e., whether a transfer sheet for printing has such a size and orientation that toner images for two sheets (pages) can be formed on the intermediate transfer body 9, as represented by, e.g., a sheet of A4 size lying with its long side going ahead.

The printing process is executed in accordance with respective modes in step S5 if the printing in units of two sheets is enabled, and in step S6 if the printing in units of one sheet is to be executed.

On the other hand, if it is determined in step S3 that full-color printing (or printing in the number of colors at which a transport time in the reversing unit is shorter than a time required for secondary transfer) is to be executed, then the control process goes to step S7, from which it branches to one of steps S8 and S9 depending on whether printing in units of two sheets is enabled or not.

Figure 3:
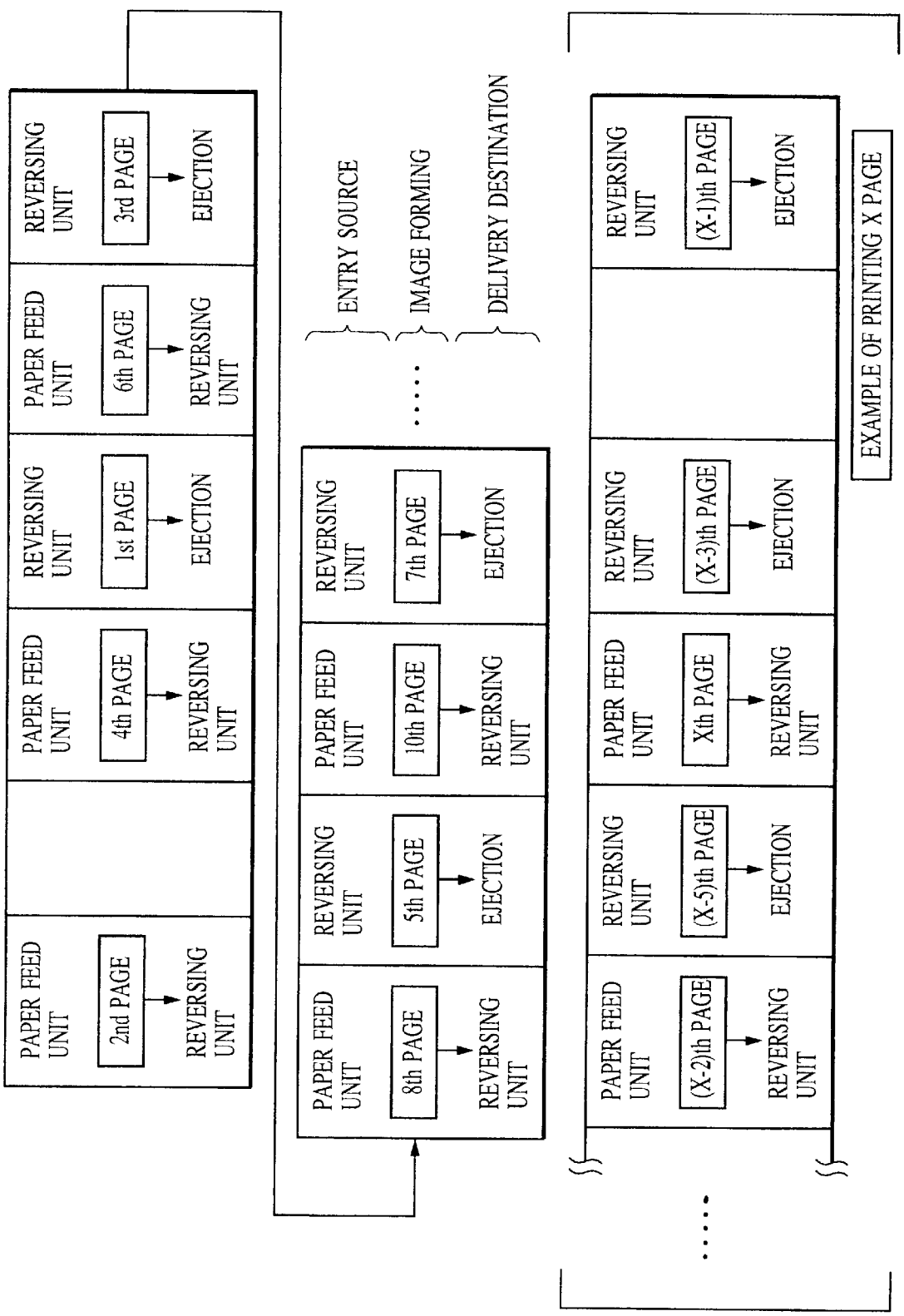
FIG. 3 is a diagram showing an image forming sequence for monochrome images in units of one sheet.

If the control process goes to step S6, then the image forming operation is executed in accordance with the sequence of FIG. 3. If the control process goes to step S5, then monochrome printing in units of two sheets is executed. The image forming sequence corresponding to step S5 has not been described above in particular. But when a time required for the reversing process in the reversing unit is shorter than a time required for secondary-transferring a toner image onto a transfer sheet from the intermediate transfer body 9, the image forming operation can be executed essentially in accordance with the sequence of FIG. 5 even for this case including monochrome development and single transfer. In other words, in this case of transferring toner images in units of two sheets, the toner image is secondary-transferred onto the second transfer sheet while the first transfer sheet is under the reversing process, and the first transfer sheet is transported back to the position of the regist roller 8 prior to completion of the secondary transfer onto the second transfer sheet.

Further, if the control process goes to step S8, then the image forming operation can be executed in accordance with the sequence of FIG. 5, and if the control process goes to step S9, then it can be executed in accordance with the sequence of FIG. 4.

Figure 7:
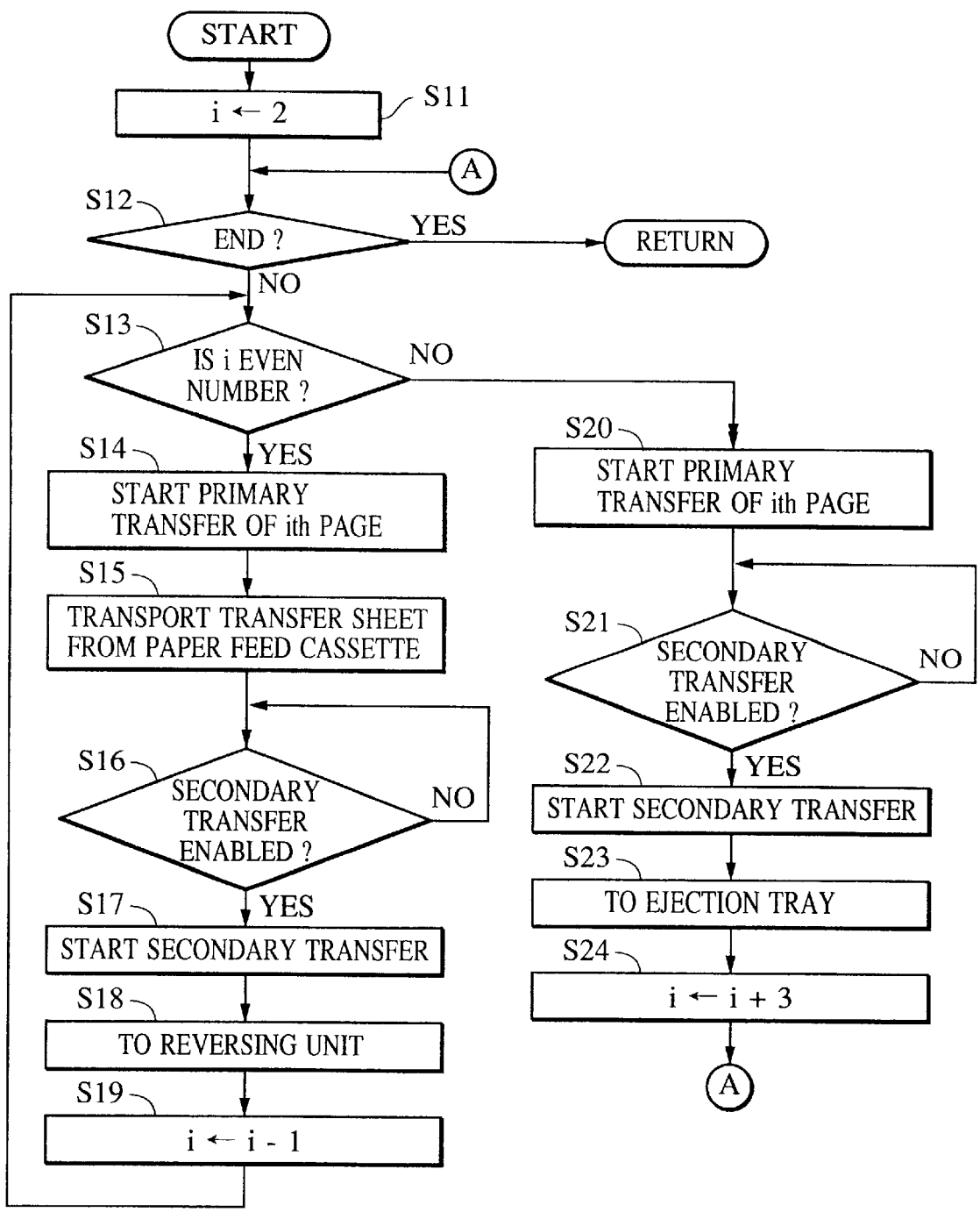
FIG. 7 is a flowchart showing an image processing procedure for full-color images in units of one sheet in step 9 of FIG. 6.

Detailed processing procedures of step S9 (full-color both-side recording in units of one sheet) will now be described with reference to a flowchart of FIG. 7.

First, in step S11, "2" is set as an initial value of a variable i. It is determined in step S12 whether the both-side recording is ended or not. If the both-side recording is determined as being ended, then this control process is ended, followed by returning to the control process of FIG. 6.

If the both-side recording is determined as being not yet ended, then the control process goes to step S13 where it is determined the variable i is an even or odd number. Because of i=2 in the initial state, the control process goes to step S14 to start formation of a Y latent image for a full-color image of a first page and primary transfer of a Y toner image onto the intermediate transfer body 9. After that, the similar image forming operation is repeated for M, C and Bk.

When the control process goes to step S15, a transfer sheet is fed from the corresponding paper feed cassette.

When the control process goes to step S16, it is determined whether the last Bk toner image has been primary-transferred onto the intermediate transfer body 9 and the transfer sheet is kept in a standby state, the latter determination being made with a sensor disposed near the regist roller 8. If so, then secondary transfer onto one side of the transfer sheet is started in step S17. The transfer sheet having a secondary-transferred image thereon is transported to the reversing unit in step S18 and the variable i is decremented by "1" in step S19, followed by returning to step S13.

When returned to step S13, the variable i is now an odd number and therefore the control process goes to step S20 to start primary transfer of an image for the page indicated by the variable i. This step S20 is the same as the step S14 described above. During the primary transfer process, the transfer sheet onto which the image has been secondary-transferred in step S17 is reversed upside down in the reversing unit and transported back to the regist roller 8.

In step S21, it is determined whether the last Bk toner image has been primary-transferred onto the intermediate transfer body 9 and the reversed transfer sheet is transported back to the regist roller 8. If so, then secondary transfer onto one the other side of the transfer sheet is started in step S22. The delivery destination of the transfer sheet is set to the paper ejection tray in step S23, and "3" is added to the variable i in step S24.

After that, by repeating to the control process subsequent to step S12, the both-side printing of full-color images is proceeded in accordance with the sequence as shown in FIG. 4.

According to this embodiment, as described above, proper selection of the image forming sequence depending on the number of colors to be recorded and the size and orientation of transfer sheets used makes it possible to effectively utilize the image memory and perform the printing process at a high speed.

While the above embodiment is described in connection with a printer, the present invention is also applicable to, e.g., copying machines.

Also, in the above embodiment, any printing modes are described in connection with transfer sheets of A4 size. However, the present invention can also be practiced for transfer sheets of letter size based on the same concept, and is subject to no restrictions depending on sheet size.

While the above embodiment is described as ejecting a transfer sheet such that its surface onto which an image has been fused finally faces downward, the present invention is not limited to such a mechanism, but may also be applied to an apparatus having a mechanism for ejecting a transfer sheet such that its surface onto which an image has been fused finally faces upward. According to the sequence of FIG. 4, the image forming is proceeded in the order of pages 2, 1, 4, 3 . . . etc. By contrast, in such a case, the image forming is proceeded in the order of pages 1, 2, 3, 4 . . . etc. This means that the capacity required for the image memory is the same as or can be made a little smaller than in the above embodiment.

Further, in the above embodiment, the control process is designed to determine whether monochrome or full-color printing is to be executed, and whether image forming in units of two sheets is enabled or not. As an alternative, however, the image forming sequence may be decided by referring to an image forming sequence table, separately prepared, based on information about those items as criteria for the determination.

The present invention may be applied to not only a system comprising a plurality of devices (such as a host computer, an interface unit, a reader and a printer), but also an equipment comprising a single device (e.g., a copying machine and a facsimile).

It is needless to say that the object of the present invention can also be achieved by supplying, to a system or equipment, a storage medium which stores program codes of software for realizing the function of the above-described embodiment, and causing a computer (or CPU and MPU) in the system or equipment to read and execute the program codes stored in the storage medium.

In such a case, the program codes read out of the storage medium serve in themselves to realize the function of the above-described embodiment, and hence the storage medium storing the program codes constitutes the present invention.

Storage mediums for use in supplying the program codes may be, e.g., floppy disks, hard disks, optical disks, photo-magnetic disks, CD-ROM's, CD-R's, magnetic tapes, non-volatile memory cards, and ROM's.

Also, it is a matter of course that the function of the above-described embodiment is realized not only by a computer reading and executing the program codes, but also by an OS (Operating System) or the like which is working on the computer and executes part or whole of the actual process to realize the function. Thus, the latter case is naturally involved in the concept of the present invention.

Further, it is a matter of course that the present invention involves such a case where the program codes read out of the storage medium are written into a memory built in a function extension board mounted in the computer or a function extension unit connected to the computer, and a CPU incorporated in the function extension board or unit executes part or whole of the actual process in accordance with instructions from the program codes, thereby realizing the function of the above-described embodiment.

In short, by executing the control as described above, optimum both-side recording can be performed depending on the number of colors to be recorded and the size and orientation of recording mediums used.

What is claimed is:

1. An image forming apparatus for forming a plurality of images successively on recording mediums, comprising:

intermediate transfer means capable of retaining an image corresponding to an image to be formed;

transfer means for transferring the retained image on said intermediate transfer means onto a recording medium;

reversing means for reversing the recording medium so that an image is to be formed on the rear side of the recording medium having the image transferred onto the front side thereof; and control means for controlling a sequence of forming the plurality of images depending on image forming conditions when the plurality of images are formed successively both sides of the recording mediums under cooperation with said reversing means, wherein the sequence of forming the plurality of images comprises a first sequence when an image forming condition indicates that the recording mediums have such size and orientation so that images for more than one recording medium can be formed on said intermediate transfer means at a time, and the sequence of forming the plurality of images comprises a second sequence when the image forming condition does not indicate that the recording mediums have such size and orientation so that images for more than one recording medium can be formed on said intermediate transfer means at a time.

2. An image forming apparatus according to claim 1, wherein an image forming condition is a forming color condition indicating whether a monochrome or full-color image is to be formed.

3. An image forming apparatus according to claim 1, wherein an image forming condition is a formed image number condition indicating whether a plurality of images are to be formed on said intermediate transfer means at a time or not.

4. An image forming apparatus according to claim 3, wherein two images are formed on the recording mediums in one rotation sequence of said intermediate transfer means under the image forming condition indicating that a plurality of images are to be formed on said intermediate transfer means at a time, and one image is formed on the recording medium in one rotation sequence of said intermediate transfer means under the image forming condition indicating that a plurality of images are not to be formed on said intermediate transfer means at a time.

5. An image forming apparatus according to claim 1, wherein an image forming condition is a recording medium orientation condition indicating an orientation in which said recording medium is transported to said image forming apparatus.

6. An image forming apparatus according to claim 1, wherein an image to be next transferred is formed on said intermediate transfer means during a reversing process by said reversing means.

7. An image forming apparatus according to claim 1, further comprising:

determining means for determining a time required for forming the plurality of images under the image forming control executed by said control means, and first informing means for informing a result determined by said determining means to an external device which has transmitted information indicating the plurality of images to said image forming apparatus.

8. An image forming apparatus according to claim 7, wherein said first informing means informs the sum of the determined result and a time resulted in consideration of a state where said image forming apparatus is occupied.

9. An image forming apparatus according to claim 1, further comprising second informing means for informing the image forming sequence used in the image forming control executed by said control means to an external storage device which has transmitted information indicating the plurality of images to said image forming apparatus.

10. An image forming apparatus according to claim 1, wherein an image forming condition is a condition indicating the number of colors used in an image to be recorded.

11. An image forming apparatus according to claim 1, further comprising a third informing means for informing said control means regarding the progress of forming the plurality of images.

12. A method of controlling an image forming apparatus for forming a plurality of images successively on recording mediums, the apparatus comprising intermediate transfer means capable of retaining an image corresponding to an image to be formed, transfer means for transferring the retained image on the intermediate transfer means onto a recording medium, and reversing means for reversing the recording medium so that an image is to be formed on the rear side of the recording medium having the image transferred onto the front side thereof, wherein said method comprises:

a control step for controlling a sequence of forming the plurality of images depending on image forming conditions when the plurality of images are formed successively on both sides of the recording mediums under cooperation with the reversing means, wherein the sequence of forming the plurality of images comprises a first sequence when an image forming condition indicates that the recording mediums have such size and orientation so that images for more than one recording medium can be formed on the intermediate transfer means at a time, and the sequence of forming the plurality of images comprises a second sequence when the image forming condition does not indicate that the recording mediums have such size and orientation so that images for more than one recording medium can be formed on the intermediate transfer means at a time.

13. A method of controlling an image forming apparatus according to claim 12, wherein an image forming condition is a forming color condition indicating whether a monochrome or full-color image is to be formed.

14. A method of controlling an image forming apparatus according to claim 12, wherein an image forming condition is a formed image number condition indicating whether a plurality of images are to be formed on the intermediate transfer means at a time or not.

15. A method of controlling an image forming apparatus according to claim 12, wherein two images are formed on the recording mediums in one rotation sequence of the intermediate transfer means under the image forming condition indicating that a plurality of images are to be formed on the intermediate transfer means at a time, and one image is formed on the recording medium in one rotation sequence of the intermediate transfer means under the image forming condition indicating that a plurality of images are not to be formed on the intermediate transfer means at a time.

16. A method of controlling an image forming apparatus according to claim 12, wherein an image forming condition is a recording medium orientation condition indicating an orientation in which the recording medium is transported to the image forming apparatus.

17. A method of controlling an image forming apparatus according to claim 12, wherein an image to be next transferred is formed on the intermediate transfer means during a reversing process by the reversing means.

18. A method of controlling an image forming apparatus according to claim 12, further comprising:

a determining step for determining a time required for forming the plurality of images under the image forming control executed by said control step, and a first informing step for informing a result determined by said determining step to an external device which has transmitted information indicating the plurality of images to the image forming apparatus.

19. A method of controlling an image forming apparatus according to claim 18, wherein said first informing step informs the sum of said determined result and a time resulted in consideration of a state where said image forming apparatus is occupied.

20. A method of controlling an image forming apparatus according to claim 12, further comprising a second informing step for informing the image forming sequence used in the image forming control executed by said control step to an external storage device which has transmitted information indicating the plurality of images to the image forming apparatus.

21. A storage medium storing control programs for forming a plurality of images successively on recording mediums by an image forming apparatus comprising intermediate transfer means capable of retaining an image corresponding to an image to be formed, transfer means for transferring the retained image on the intermediate transfer means onto a recording medium, and reversing means for reversing the recording medium so that an image is to be formed on the rear side of the recording medium having the image transferred onto the front side thereof, wherein said storage medium stores program codes for a control step for controlling a sequence of forming the plurality of images depending on image forming conditions when the plurality of images are formed successively on both sides of the recording mediums under cooperation with the reversing means, and wherein the sequence of forming the plurality of images comprises a first sequence when an image forming condition indicates that the recording mediums have such size and orientation so that images for more than one recording medium can be formed on the intermediate transfer means at a time, and the sequence of forming the plurality of images comprises a second sequence when the image forming condition does not indicate that the recording mediums have such size and orientation so that images for more than one recording medium can be formed on the intermediate transfer means at a time.

22. A storage medium according to claim 21, wherein an image forming condition is a forming color condition indicating whether a monochrome or full-color image is to be formed.

23. A storage medium according to claim 21, wherein an image forming condition is a formed image number condition indicating whether a plurality of images are to be formed on the intermediate transfer means at a time or not.

24. A storage medium according to claim 21, wherein two images are formed on the recording mediums in one rotation sequence of the intermediate transfer means under the image forming condition indicating that a plurality of images are to be formed on the intermediate transfer means at a time, and one image is formed on the recording medium in one rotation sequence of the intermediate transfer means under the image forming condition indicating that a plurality of images are not to be formed on the intermediate transfer means at a time.

25. A storage medium according to claim 21, wherein an image forming condition is a recording medium orientation condition indicating an orientation in which the recording medium is transported to the image forming apparatus.

26. A storage medium according to claim 19, wherein an image to be next transferred is formed on the intermediate transfer means during a reversing process by the reversing means.

27. A storage medium according to claim 19, further comprising:
   program codes for a determining step for determining a time required for forming the plurality of images under the image forming control executed by said control step, and
   program codes for a first informing step for informing a result determined in said determining step to an external device which has transmitted information indicating the plurality of images to the image forming apparatus.

28. A storage medium according to claim 27, wherein the first informing step informs the sum of the determined result and a time resulted in consideration of a state where said image forming apparatus is occupied.

29. A storage medium according to claim 21, further comprising program codes for a second informing step for informing the image forming sequence used in the image forming control executed by said control step to an external storage device which has transmitted information indicating the plurality of images to the image forming apparatus.

* * * * *

UNITED STATES PATENT AND TRADEMARK OFFICE
CERTIFICATE OF CORRECTION

PATENT NO.    : 6,204,927 B1
DATED         : March 20, 2001
INVENTOR(S)   : Keita Saito et al.

It is certified that error appears in the above-identified patent and that said Letters Patent is hereby corrected as shown below:

Column 2,
Line 24, "sheet." should read -- sheets. --.
Line 48, "an" should read -- a --.

Column 5,
Line 56, "are" should read -- is --.

Column 6,
Line 5, "the" should be deleted.
Line 24, "the" should be deleted.

Column 14,
Line 10, "both" should read -- on both --.

Column 15,
Line 50, "claim 12," should read -- claim 14, --.

Column 16,
Line 58, "claim 21," should read -- claim 23, --.

Column 17,
Line 5, "claim 19," should read -- claim 21, --.
Line 9, "claim 19," should read -- claim 21, --.

Signed and Sealed this

Second Day of April, 2002

*Attest:*

*Attesting Officer*

JAMES E. ROGAN
*Director of the United States Patent and Trademark Office*